Feb. 22, 1938. E. C. LONG 2,108,865
PISTON FOR INTERNAL COMBUSTION MOTORS
Filed June 10, 1935
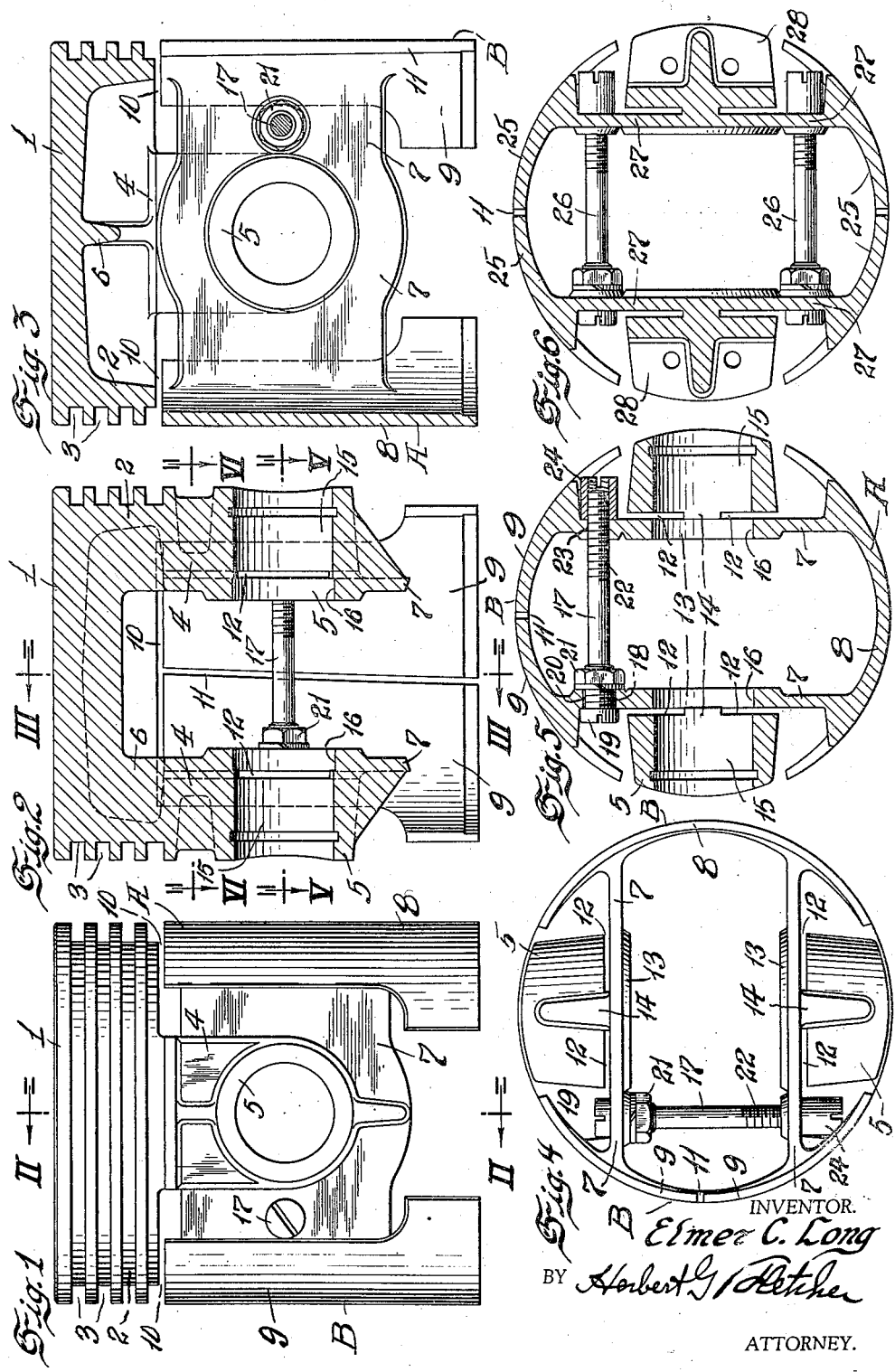
INVENTOR.
Elmer C. Long
BY Herbert J. Fletcher
ATTORNEY.

Patented Feb. 22, 1938

2,108,865

UNITED STATES PATENT OFFICE 2,108,865

PISTON FOR INTERNAL COMBUSTION MOTORS

Elmer C. Long, Grosse Pointe Park, Mich.

Application June 10, 1935, Serial No. 25,751

17 Claims. (Cl. 309—13)

This invention relates to pistons for internal combustion motors and particularly to pistons made from an aluminum alloy metal, and in which the bearing walls of the skirt are disconnected from the side wall of the head and are resiliently and flexibly connected to the pin bosses.

The invention also is a furthering of the improvements in pistons, disclosed in U. S. Letters Patent No. 2,017,630, granted to me October 15, 1935, for Pistons for internal combustion motors, the instant application having distinctly different and specific improvements, not disclosed in said copending application.

The main object of the invention is to provide a piston whereby thermal expansion of the head on a diameter across the pin bosses will be made coactable with the skirt sections through the supports for the sections which are extended from the pin bosses for tending to draw the skirt sections inwardly and thus preventing them from seizing the cylinder wall of a cylinder.

Another object of the invention is the provision of means which form part of the piston for adjusting the skirt sections to a precise degree for fitting the piston in the cylinder.

Other objects and advantages will appear as this description progresses and by reference to the drawing, in which:

Figure 1 is a view in side elevation of a piston constructed in accordance with my invention.

Figure 2 is a vertical section taken approximately on the line II—II of Fig. 1.

Figure 3 is a vertical section taken approximately on the line III—III of Fig. 2.

Figure 4 is an open end view of the piston shown in Fig. 1.

Figure 5 is a horizontal section taken approximately on the line V—V of Fig. 2.

Figure 6 is a horizontal section showing a modified form of the invention, and as taken on the line VI—VI of Fig. 2.

Referring to Figs. 1 to 5 inclusive of the drawing, this improved piston comprises a head 1 having a side wall 2 with packing ring recesses 3 on its outer periphery and depended from the side wall in diametrically opposite disposition are legs 4 and integral with each leg is a pin boss 5. Joining the head 1 the side wall 2 and the legs 4 is a web 6.

Paralleling each leg 4 inwardly thereof and spaced therefrom is a transverse wall 7, said walls at their extending ends on one side of the pin bosses joining a skirt section 8 which forms the power thrust side A of the piston, and the extending ends of the walls on the other side of the pin bosses joining the compression thrust side B of the skirt, said compression thrust side comprising two slipper sections 9.

The skirt section 8 (power thrust side A) and the slipper sections 9 (compression thrust side B) comprise the skirt of this improved piston, said sections 8 and 9 being separated from the side wall 2 of the head 1 by transverse gaps 10, and the slipper sections 9 being separatd from one another by the longitudinally extending slot 11 which extends from top to bottom of the slipper sections.

The walls 7 where they each connect with respective pin bosses 5 are partially severed from the pin bosses by slots 12 (Figs. 4 and 5), thus forming a partially separated pin boss part 13 on the inner end of each pin boss wherein the part 13 of each pin boss 5 is joined with the pin boss proper on its upper and lower sides only, by connectors as shown at 14 in Figs. 4 and 5.

This partial severing of the walls 7 from the pin bosses 5 will provide for a greater flexibility of the walls with the pin bosses during operation of the piston in the cylinder of a motor, and for further assisting the flexible connection of the walls with the pin bosses, the pin bores 15 of the bosses are enlarged as indicated at 16 in each pin boss part 13. This is for the purpose of preventing binding, if any, of the parts 13 although it may hereinafter be found not to be necessary to enlarge the pin bore of the parts 13.

The walls 7 intermediate the pin bosses and the slipper sections 9 are provided with a tie bolt 17 which passes through said walls, said bolt preferably being of a metal of material having a less co-efficient of expansion than the material of the piston.

The tie bolt 17 is provided with an enlarged threaded portion 18 adjacent its head 19, said enlarged portion being located in the unthreaded opening 20 which is formed in one of the walls 7 and cooperable with the threads of said enlarged portion 18 is an adjusting nut 21. The other end of the tie bolt 17 is threaded as shown at 22, said threaded end being engaged in the threaded opening 23 of the other wall 7, and cooperable with the threads 22 of the extending end of the tie bolt 17 is a lock nut 24.

In the operation of this improved piston when mounted in the cylinder of an internal combustion motor, as the head 1 of the piston will receive the greatest heat from the burning fuel in the cylinder, expansion of the head of the piston on a diameter across the pin bosses will carry the pin bosses outwardly from one another to the approximate same degree to which the head is expanded. As the walls 7 which support the slipper sections 9 are connected with the tying bolt 17 which is of a low co-efficient of expansion comparable with the body of the piston, that portion of said walls between the tie bolt 17 and the slipper sections will be held by the bolt from being carried outwardly by the outward moving forces of the pin bosses and in fact, the slipper sections will be moved inwardly towards each other by reason of the tie bolt 17 serving as a toggle because of the inner ends of the walls being connected to respective pin boss parts 13 which will be carried outwardly with the pin bosses 5.

Owing to the manner in which the parts 13 are connected to respective pin bosses 5 by axially alining connectors 14, said parts and the walls 7 extending therefrom will fulcrum on the connectors as the pin bosses are moved outwardly by expansion by reason of the tie bolt 17 preventing the walls 7 from being carried outwardly by the outward travel of the pin bosses, and thus causing the slipper sections 9 to move inwardly thereby withholding the slipper sections 9 from too tightly engaging the cylinder wall and thus preventing scoring of either the piston skirt or the cylinder.

The tie bolt 17 can also be used for adjusting the slipper sections 9 for providing a working fit of the skirt in the cylinder.

In addition to the walls 7 and the tie bolt 17 operating to draw the slipper sections 9 towards each other, said walls 7 which connect the skirt section 8 will also be flexed by the outward movement of the pin bosses 5, thus tending to draw said skirt section 8 inwardly towards the pin bosses.

In certain instances it may be desirable to make both thrust sides of the piston skirt uniform and in the manner as shown in Fig. 6 wherein each skirt thrust side comprises a pair of slipper sections 25 and a tie bolt 26 is mounted in the walls 27 on each side of the pin bosses 28 so that a uniformity of action will be carried out in respect to drawing in each pair of slipper sections, as the pin bosses 28 are moved outwardly by expansion of the head.

Having thus described my invention so that those skilled in the art will be able to practice the same, what I desire to secure by Letters Patent is defined in what is claimed, it being understood that various changes in the pistons shown and described above in detail and not amounting to invention may be made without departing from the spirit and scope of my invention.

What I claim is:

1. A piston comprising a head, a skirt, pin bosses, and walls joining said skirt and bosses, the joining of said walls with said bosses being in the diametral planes only of the inner ends of said bosses axially of the piston.

2. A piston comprising a head, a skirt, pin bosses, walls joining said skirt and bosses, the joining of said walls with said bosses being in the diametral planes only of the inner ends of said bosses axially of the piston, said skirt having a longitudinal slot on one of its thrust sides, and a tying member joining said walls adjacent the slotted thrust side.

3. A piston comprising a head, a skirt, pin bosses, walls joining said skirt and bosses, the joining of said walls with said bosses being in the diametral planes only of the inner ends of said bosses axially of the piston, said skirt having a pair of slipper sections forming one of its thrust sides, and a tying member connecting said walls adjacent said slipper sections.

4. A piston comprising a head, a skirt, pin bosses, walls joining said skirt and bosses, the joining of said walls with said bosses being in the diametral planes only of the inner ends of said bosses axially of the piston, said skirt having a pair of slipper sections forming one of its thrust sides, and a tying member of material different than the piston connecting said walls adjacent said slipper sections.

5. A piston comprising a head, a skirt, pin bosses, walls joining said skirt and bosses, the joining of said walls with said bosses being in the diametral planes only of the inner ends of said bosses axially of the piston, said skirt having a pair of slipper sections which are separated from the head and forming one of its thrust sides, and a tying member of material different than the piston connecting said walls adjacent said slipper sections.

6. A piston comprising a head, a skirt, pin bosses, walls joining said skirt and bosses, the joining of said walls with said bosses being in the diametral planes only of the inner ends of said bosses axially of the piston, said skirt having a pair of slipper sections which are separated from the head and forming one of its thrust sides, and a tying member connecting said walls adjacent said slipper sections.

7. A piston comprising a head, a skirt, pin bosses, and a pair of walls connected at their ends to opposing sides of the skirt and having intermediate connection with a respective pin boss in the diametral planes only of the inner ends of said bosses axially of the piston.

8. A piston comprising a head, a skirt, pin bosses, walls joining said skirt and the inner ends of said bosses in the diametral planes only axially of the piston, said skirt being slotted on one side between the joining of said walls therewith, and a transverse tying member joining said walls adjacent the slotted side of the skirt.

9. A piston comprising a head, a skirt, pin bosses, walls joining said skirt and the inner ends of said bosses above and below the pin bores thereof in their vertical diametral planes only, said skirt having a pair of slipper sections which are separated from the head and forming one of its thrust sides, and a tying member connecting said walls adjacent said slipper sections.

10. A piston comprising a head, a skirt separated from the head, pin bosses depending from the head, each pin boss having an alining pin boss part joined thereto in the diametral plane only thereof axially of the piston, walls joining said skirt and respective pin boss parts, said skirt having a pair of slipper sections forming one of its thrust sides, and a tying member of material different than the piston connecting said walls adjacent said slipper sections.

11. A piston comprising a head, a skirt, pin bosses, each pin boss having an inner disposed pin boss part which is connected thereto in the diametral plane only of the inner end thereof axially of the piston, and walls joining said skirt and the respective pin boss parts of said bosses.

12. A piston comprising a head, a skirt, pin bosses, each pin boss having an alining pin boss part joined thereto in the diametral plane only thereof axially of the piston, and walls joining said skirt and respective pin boss parts.

13. A piston comprising a head, a skirt having opposing thrust sides, pin bosses, each pin boss having an alining pin boss part joined thereto in the diametral plane only thereof axially of the piston, said skirt being longitudinally slotted on one of its thrust sides, and walls joining said skirt and respective pin boss parts.

14. A piston having a head, a cross-head structure connected to the head and comprising diametrically opposite slipper sections, pin bosses between the slipper sections each having an alining pin boss part joined thereto in the diametral plane only thereof axially of the piston, and walls joining said slipper sections and respective pin boss parts.

15. A piston comprising a head, a skirt having opposing slotted thrust sides and pin bosses, each pin boss having an alining pin boss part joined thereto in the diametral plane only thereof axially of the piston, and walls joining said skirt and respective pin boss parts.

16. A piston comprising a head, a skirt having opposing slotted thrust sides and pin bosses, each pin boss having an alining pin boss part joined thereto in the diametral plane only thereof axially of the piston, walls joining said skirt and respective pin boss parts, and a tying member connecting said walls disposed on each side of the pin bosses.

17. A piston having a head, a cross-head structure connected to the head and comprising diametrically opposite slipper sections, pin bosses between the slipper sections each having an alining pin boss part joined thereto in the diametral plane only thereof axially of the piston, walls joining said slipper sections and respective pin boss parts, and a tying member connecting said walls disposed on each side of the pin bosses.

ELMER C. LONG.